United States Patent [19]

Jannard

[11] Patent Number: 5,249,001
[45] Date of Patent: Sep. 28, 1993

[54] EARSTEM FOR EYEGLASSES PROVIDING RETENTION

[75] Inventor: James H. Jannard, San Juan Capistrano, Calif.

[73] Assignee: Oakley, Inc., Irvine, Calif.

[21] Appl. No.: 758,271

[22] Filed: Aug. 27, 1991

Related U.S. Application Data

[63] Continuation of Ser. No. 436,473, Nov. 17, 1989, abandoned.

[51] Int. Cl.$^5$ .............................................. G02C 5/14
[52] U.S. Cl. .................................. 351/123; 351/111
[58] Field of Search .......................... 351/111-123, 351/44; 2/448, 449, 450; D16/114, 117, 118, 116, 115, 119; 381/49

[56] References Cited

U.S. PATENT DOCUMENTS

| | | | |
|---|---|---|---|
| D. 182,459 | 4/1958 | Eisler | D16/116 |
| 265,916 | 10/1882 | Carpenter | 351/111 |
| D. 322,975 | 1/1992 | Bolle | |
| 1,338,880 | 5/1920 | Stevens | 351/111 |
| 2,108,074 | 2/1938 | McMahon | 351/111 |
| 2,561,402 | 7/1951 | Nelson | |
| 3,684,356 | 8/1972 | Bates | |
| 3,944,344 | 3/1976 | Wichers | |
| 4,240,718 | 12/1980 | Wichers | 351/62 |
| 4,859,048 | 8/1989 | Jannard | 351/44 X |
| 4,951,322 | 9/1989 | Lin | 351/44 |

FOREIGN PATENT DOCUMENTS 2204143  4/1987  United Kingdom .

Primary Examiner—Rodney B. Bovernick
Assistant Examiner—Hung Xuan Dang
Attorney, Agent, or Firm—Knobbe, Martens, Olson & Bear

[57] ABSTRACT

Earstems for eyewear are configured to define a lateral distance between the earstems which is greater than the width of the head in the anterior temple region so as to prevent any contact of the earstems and the head in that region. Preferably, the earstems include a diverging section, a transition section, a converging section and a retaining section, wherein the transition section defines the greatest lateral distance between the earstems. The retaining section extends posteriorly from the converging section so as to provide an interfacing surface between the eyewear and the head. The retaining section may be configured so as to accommodate the traction device so as to enhance the retention of the eyewear about the head by increasing the coefficient of static friction between the eyewear and the head.

7 Claims, 2 Drawing Sheets

EARSTEM FOR EYEGLASSES PROVIDING RETENTION

This application is a continuation of application Ser. No. 436,473, filed Nov. 17, 1989 now abandoned.

BACKGROUND OF THE INVENTION

The present invention relates to eyewear, and more particularly to earstems configured to accommodate a wide deviation from the standard Alderson head size while providing a medially directed force at the distal portion of the earstems so as to increase the retentive force between the eyewear and the head.

Although corrective lenses are specifically crafted to accommodate the unique vision defects of an individual, the frames and earstems used to retain the lenses are typically a standard size and not crafted to conform to the particular contours of the head of each individual. Lenses which are employed in filtering eyewear such as sunglasses are also typically retained in stock frames. As it is virtually impossible to mass produce stock frames which fit every individual's head, the stock frames are constructed to conform to an idealized "standard" adult head such as that known in the art as the standard Alderson head form.

In determining the dimensions of the standard adult head, statistical data reflecting the range of cranial dimensions in an adult population was compiled to provide a hypothetical size head which represents the statistical median of the normal variations in the size of the adult head. These standard dimensions are then used to size the stock frames. Typically, the Alderson head form provides the anatomical model upon which stock frames are based. Therefore, the stock frames are constructed to conform to the hypothetical "standard" head rather than specific individuals.

As a result, such frames often result in a fit which is either too tight or too loose about the head of an individual. A tight fitting frame may cause localized pain and headaches, while a loose fitting frame may allow the eyewear to fall from the head and damage the frame or the lens. This is particularly disadvantageous for protective eyewear such as sunglasses which are to be used in active sports, such as bicycle racing or skiing. Additionally, in the event that corrective lenses vary in weight between the lenses, the uneven weight distribution may create localized pressure points causing discomfort.

A variety of means have been employed to improve the securing of eyewear to the head. These devices have included modifications from the use of the traditional hook at the end of the temple bar for wrapping behind the ear to loose strings or straps which connect the temples of the eyewear around the back of the wearer's head, thereby preventing the glasses from becoming completely displaced from the body. Alternatively, an elastic strap connecting the temples has been employed to engage the wearer's head and secure the eyewear in the desired position.

The prior attempts to improve the retention of eyewear about the wearer's head have also included the use of rubber or rubber-like plastic boots applied to the free ends of the temples for increasing the friction between the eyeglasses and the head, such as shown in U.S. Pat. No. 3,684,356 to Bates. The Bates device, however, appears somewhat clumsy and, therefore, detracts from the appearance of the eyewear. In addition, the Bates device does not provide for a greater variation in the range of head widths on which the glasses can be worn. For example, a wider than median head will frequently contact the inside surface of the temple bar somewhere in between the eyeglass frame and the hook over the ear. This causes the hook portion to be lifted away from the ear, thereby nullifying any advantage to such boots as the Bates device.

Another prior attempt to improve eyewear retention is disclosed in the Nelson patent (U.S. Pat. No. 2,561,402), which discloses use of fluid chambers at the interface of the free end of the temples and the head. Nelson uses the fluid chambers in an effort to evenly distribute pressure between the temple and the head. As the fluid chambers of Nelson are permanently affixed to the temple in a predetermined orientation, modification for specific individuals is unavailable. In addition, the fluid retained within the chambers adds an undesired weight to the eyewear, the device is relatively complex from a manufacturing point of view, and the durability of the device is likely not as good as solid plastic alternatives.

Notwithstanding the foregoing, there remains a need for providing a means of improving the compatibility of eyewear and the wearer so as to improve retention of the eyewear throughout a broader spectrum of head sizes within the population. A need also exists for a device which may be used in conjunction with a lens retained within a frame or alternatively, a lens alone. A further need exists for a device which may be used in cooperation with supplemental retaining devices without permanently altering the configuration of the eyewear.

SUMMARY OF THE INVENTION

In accordance with the present invention, an improved earstem for eyewear is disclosed. The earstems create a medially directed force at the distal end of the earstems wherein the distal ends can accommodate a broad range of head widths without sacrificing the medially directed force. The earstems are configured to minimize the contact of the earstem and the lateral anterior portion of the head while maintaining eyeglass retaining forces throughout a wide range of head sizes.

The earstems of the present invention may be attached to frames which position a lens in front of the eyes, or alternatively, the earstems may be attached directly to the lens. In addition, curved or substantially linear frames or lenses may be used in cooperation with the earstems, wherein the distal end of the earstem may be looped or substantially linear.

Thus, there has been provided in accordance with one aspect of the present invention an eyeglass earstem for securing an eyeglass frame or eyeglass lens to the head of the wearer, and for positioning the lens in the wearer's line of sight, the earstem in combination with an eyeglass frame or lens adapted to maintain a medially inwardly directed bias on the distal end of the earstem over a wide range of lateral positions, thereby accommodating a wide range of head widths. The earstem comprises an elongate earstem body having a proximal end adapted for attachment to an eyeglass frame or lens, as is well known in the art. A distal end is provided on the elongate earstem body for extending along side the head of the wearer and in the region of the wearer's ear.

The earstem body is further provided with a diverging section which inclines away from the head in the distal direction so as to provide a lateral distance between the earstem and the head of the wearer, thereby precluding contact between a substantial portion of the diverging section and the head.

A converging section is additionally provided on the earstem, and disposed distally relative to the diverging section, so that the converging section is inclined back towards the head in the distal direction so as to decrease the lateral distance between the earstem and the head of the wearer.

The distal end of the diverging section is disposed at the greatest distance away from the head of the wearer, and the distal end of the diverging section is connected to the proximal end of the converging section by a transition section on the earstem. The transition section is preferably an angled joint between the diverging section and the converging section; however, the transition section may also be provided with an axial length which extends distally alongside of and spaced apart from the head of the wearer.

A retaining section is provided on the earstem distal of the distal end of the converging section. The retaining section extends alongside and substantially in contact with the head of the wearer, for transmitting eyeglass retention force in a medial direction against the head of the wearer.

Preferably, the retaining section is configured to employ an elastomeric traction device or other friction enhancing structures or surface textures to further enhance the coefficient of static friction between the eyewear and the head.

The configuration of the present invention thereby provides for a wide range of posterior head widths without losing medially directed force at the distal end due to contact between the earstem and the anterior temple of the wearer.

DETAILED DESCRIPTION OF THE PREFERRED EMBODIMENT

As used in the present application, "eyewear" is a general term intended to embrace optical devices containing corrective lenses for defects in vision or lenses for such special purposes as filters for absorbing or blocking portions of the electromagnetic spectrum, providing physical shields for the eyes or making available other physical or optical functions for protective or visual assisting purposes.

Figure 1:
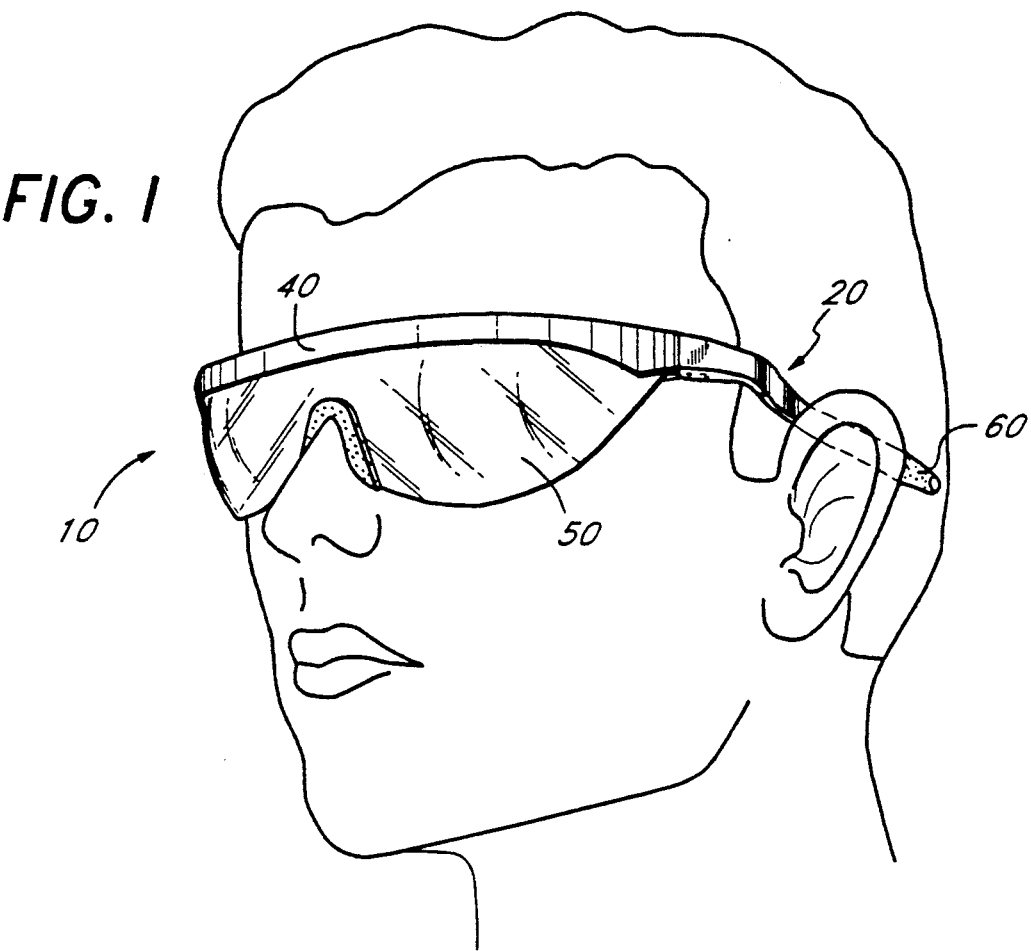
FIG. 1 is a perspective view of eyewear embodying the earstems of the present invention.

Referring to FIG. 1, eyewear 10 is disclosed incorporating an earstem 20 in accordance with the present invention, affixed to a frame 40 so as to position a lens 50 in front of the eyes. The earstems 20 extend distally from the frame 40 and over the ears of the wearer so as to retain the eyewear 10 in the desired position relative to the head. As shown in FIG. 1, the earstem 20 may include a traction device 60, as described in my co-pending patent application for IMPROVED ELASTOMERIC TRACTION DEVICE filed Nov. 20, 1989 Ser. No. 436,474, now U.S. Pat. No. 5,054,903 and incorporated herein by reference.

Figure 2:
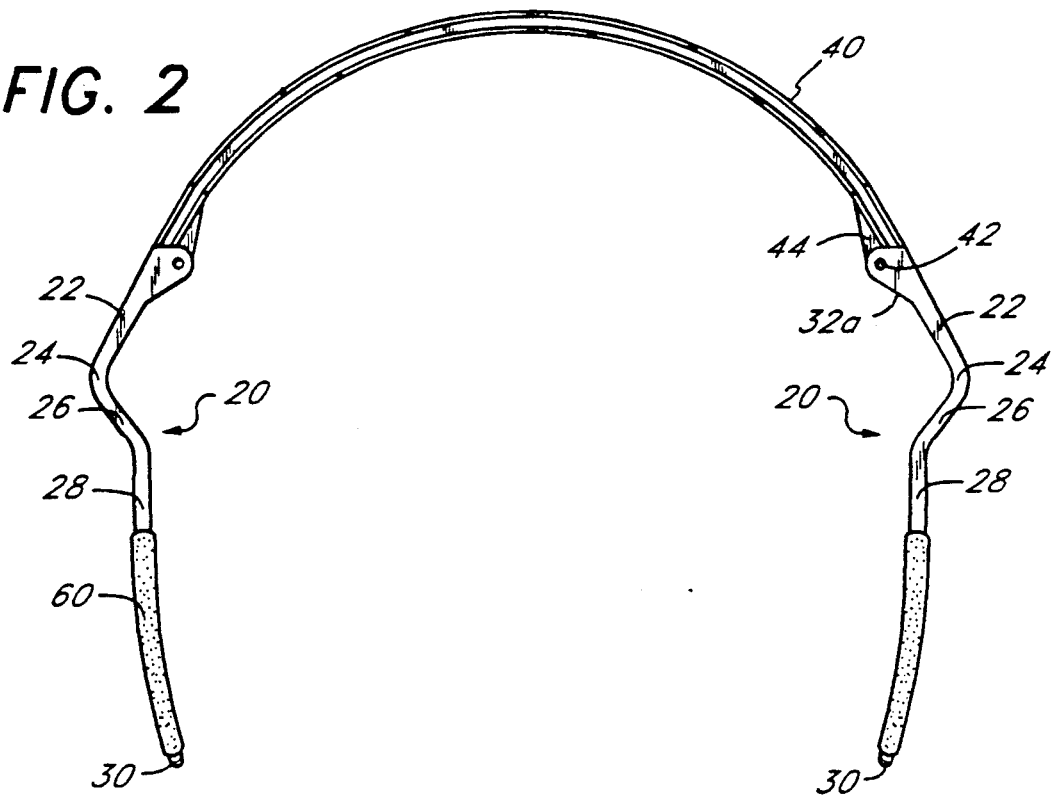
FIG. 2 is a bottom plan view of an embodiment of the earstems of the present invention, pivotally secured to an eyeglass frame.

Referring to FIG. 2, the earstems 20 of the present invention are shown in a bottom plan view. Each earstem 20 extends distally from the frame 40 to terminate at a distal end 30. Although the earstem 20 is shown affixed to the frame 40, the earstem 20 may be attached directly to the lens 50. Preferably, the earstems 20 are hingeably attached to the frame 40 or lens 50, and most preferably hingeably and removably attached, as well known in the art.

In a typical hingeable connection, the frame 40 or lens 50 includes a hinge aperture 42 extending through a protruding flange 44. The earstem 20 includes a pair of parallel apertured flanges 32a, 32b spaced so as to receive the flange 44 of the frame 40 or lens 50 therebetween. The apertures in the earstem 20 are aligned with apertures of the frame 40 or lens 50 and a pin is inserted so as permit rotation of the frame 40 relative to the earstem 20, thereby providing the hingeable connection. In a typical readily detachable hinge, the aperture 42 is replaced by an integral pin (not illustrated) which extends away from flange 44 in opposite directions along the same axis as the aperture 42. The flange 44 is inserted by deformation in between the opposing flanges 32a and 32b, and the integral pin snaps into the apertures on flanges 32a and 32b.

As shown in FIG. 2, the earstems 20 include a diverging section 22, a transition section 24, a converging section 26 and a retaining section 28. Preferably, the diverging section 22 extends from the hingeable connection with the frame 40 away from the opposing earstem 20; that is, to define an increasing lateral distance between the earstems 20. As shown in FIG. 2, when used in cooperation with a curved unitary lens 50 or frame 40, the diverging section 22 may extend substantially along the arc of, or radially outwardly from the frame 40. However, when used in connection with a substantially straight or linear frame, the diverging section 22 may form an obtuse angle therewith so as to extend away from the opposing earstem 20. Preferably, the diverging section 22 defines a sufficient angle with the frame 40 or lens 50 so as to define a lateral distance sufficient to span the width of the anterior portion of the temple region of a majority of the population.

Referring to FIG. 2, the diverging section 22 terminates at the transition section 24. The transition section 24 represents the intersection of the diverging section 22 and the converging section 26. Preferably, the transition section 24 represents the greatest lateral distance between the earstems 20, and, as a consequence, the transition portion 24 will be spaced apart from the head of the wearer. In the embodiment illustrated in FIG. 2, the transition section 24 is simply a bend in the direction of the earstem so that the earstem is angled back toward the head of the wearer in the distal direction. Alternatively, the transition section 24 may have an elongated axial dimension so as to extend the overall length of the earstem in the distal direction.

The converging section 26 begins at the transition section 24 and inclines toward the opposing earstem 20 so as to define a decreasing lateral distance. Preferably, the lateral distance at the termination of the converging section 26 is substantially equal to the actual width of the median sized adult head.

Figure 3:
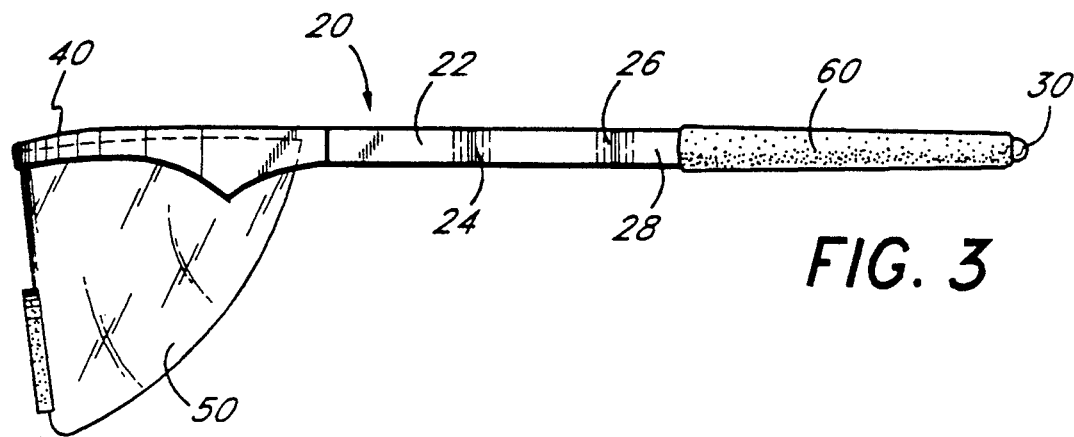
FIG. 3 is a side elevational view of an embodiment of the invention showing the incorporation of an elastomeric traction device.

The converging section 26 terminates at the retaining section 28, typically at a point which is between $\frac{1}{4}$ and $\frac{3}{4}$ the overall length of the earstem, and preferably is between about ¼ and ½ the overall length of the earstem from the proximal end thereof. The retaining section 28 extends distally to terminate at the distal end 30 of the earstem 20. As shown in FIGS. 1-3, the distal ends 30 are shown to have a substantially linear configuration in the vertical plane; however, the distal ends may be configured to define a hook or loop, as well known in the eyewear art.

The retaining section 28 may converge slightly in the distal direction in the horizontal plane as illustrated in FIG. 2, or alternatively, may extend substantially parallel to the opposing earstem 20. Although the retaining sections 28 may be employed in a substantially parallel configuration, it is preferable that the retaining sections 28 slightly converge as they extend from the converging section 26 to the distal end 30. In addition, the earstems 20 may be produced so as to exhibit an inherent bias toward the opposing earstem. This bias may be achieved by forming the earstem 20 from any of a variety of well-known polymers which exhibit an inherent resiliency. Preferably, the earstems 20 are integrally molded from any of a variety of known thermoplastic materials. Alternatively, the earstem 20 may be produced with a reduced inherent bias. These earstems are connected to the frame 40 or lens 50 in cooperation with a spring bias which urges the earstems 20 towards each other. The spring bias may be achieved through use of a spring member in the hinge or an elastic material within the hinge which urges the distal end of the earstems 20 towards each other.

Each of the diverging section and the converging section are illustrated in FIG. 2 as being substantially linear, separated by an obtuse angle which has been identified as the converging section. However, the diverging section 22, converging section 26 and transition section 24 can also be configured to form a continuous arc of substantially constant or varying radius, and still accrue the advantages of the present invention. In addition, although the diverging section 22 and the converging section 26 are illustrated as meeting at transition section 24, the transition section 24 can also be axially elongated in the distal direction. In this embodiment, the diverging section 22 will encounter a first angle at the junction of the diverging section 22 and the transition section 24, and the transition section 24 will encounter a second angle at the junction of the transition section 24 and the converging section 26.

Preferably, the retaining section 28 is configured to employ an elastomeric traction device 60, as described in my above-referenced co-pending application. The traction device 60 is disposed proximal to the distal end 30 of the earstems 20, and distal to the converging section 26 of the earstems 20. Preferably, the retaining sections 28 include a posterior shoulder (not shown) proximal to the distal end 30. The posterior shoulder is sized to engage an elastomeric traction device 60 so as to prevent distal axial displacement of the traction device 60. The traction device 60 provides an outer surface which enhances the retention of the eyewear relative to the head by providing an increased coefficient of static friction between the eyewear and the head. A preferred material for the traction device is KROTON G, manufactured by Shell Oil Company.

As shown in FIG. 3, the earstems 20 extend horizontally in a distal direction from the frame 40 or lens 50. Although not shown, the earstems 20 may be configured to exhibit an elevational or vertical displacement as they extend distally. However, in the preferred configuration, the earstems 20 extend substantially horizontally from the frame 40 as illustrated.

Figure 4:
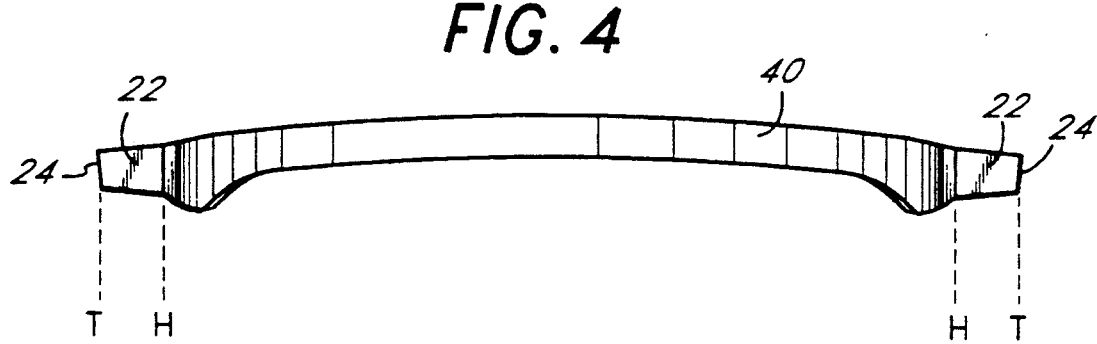
FIG. 4 is a front elevational view of the earstems of the present invention secured to an upper lens frame.

Referring to FIG. 4, the front elevational view of the frame 40 and earstems 20 illustrates the relative lateral distance at the transition section 24 with respect to the hinge and lens 50. FIG. 4 illustrates the lateral distance defined by the transition section 24, as opposed to the lateral distance defined by the frame 40. Axes T represent the lateral most extent defined by the earstems 20 at the transition section 24, and axes H represent the lateral location of the connection of the earstems 20 to the frame 40. As shown in FIG. 4, the T axis is disposed outside of axis H so that the earstems 20 define a greater lateral distance than the frame 40, and head of the wearer.

Thus, eyeglasses embodying the improved earstem of the present invention accrue several advantages over the prior art eyeglasses having earstems provided with the traditional ear hook at the distal end thereof. For example, particularly a problem with the larger head sizes, the length of the prior art earstem from the hinge point to the distal end only enables the eyeglasses to comfortably and securely fit on head sizes up to a maximum beyond which the ear hook renders the eyeglasses painful to wear or completely unwearable. The improved earstem of the present invention enables manufacture of eyeglasses having an earstem without the distal hook so that the glasses may be comfortably worn on individuals having a greater linear dimension from the front of the face to the ear without discomfort.

Elimination of the traditional hook on the earstem is made possible by the provision in accordance with the present invention of a medially inwardly directed force on the distal part of the earstem. The construction of the earstem of the present invention also enables the eyeglasses embodying earstems according to the present invention to comfortably and securely fit on a wider variety of head widths. Traditional earstems proceed in a substantially linear fashion from the hinge point back to the distal end. When eyeglasses embodying such earstems are placed on a head which is substantially wider than the median head size, the traditional earstems will tend to contact the head immediately adjacent or distal to the hinge point, and that will cause the distal end of the earstems to be radially outwardly displaced from the head of the wearer. In this manner, the distal ends of the earstems no longer provide a medially inwardly directed force to retain the earstems on the head.

In accordance with the earstem design of the present invention, the diverging section which inclines away from the medial side in the distal direction, combined with the converging section on the earstem which inclines medially in the distal direction, spaces the proximal portion of the earstem well apart from the head of the wearer, so that when the earstems are placed on a wider-than-median head, a medially (radially inwardly directed) force will still be exerted at the distal end of the earstem against the head of the wearer. Thus, the lateral distance between the distal ends of the earstems, such as illustrated in FIG. 2, can be varied over a wider range than in the prior art, while still maintaining the medially directed force on the distal portion of the earstems and not on a more proximal portion thereof.

This present invention has been described in detail in connection with the preferred embodiments, but these are examples only and the present invention is not restricted thereto. It will be easily understood by those skilled in the art that other variations and modifications can easily be made within the scope of this invention, which is defined by the following claims.

I claim:

1. Eyewear comprising two earstems in combination with a unitary arcuate upper frame configured to accommodate a range of head widths while providing a medially directed force at the distal ends of the earstems, and while minimizing contact between the proximal portions of the earstems and the head, each of said earstems comprising:

a hinge element at the proximal end of the earstem;

a diverging section extending from the proximal end of the earstem, distal to said hinge;

a transition section on the earstem distal to and adjacent said diverging section, which increases the lateral distance between the transition section and the head;

a converging section distal to said transition section; and a retaining section on the earstem disposed distally to the converging section, said retaining section disposed so as to provide a medially directed force in contact with the side of the head, wherein the intersection of the converging section and the retaining section is at a point within the range of from about $\frac{1}{4}$ to about $\frac{1}{2}$ the overall length of the earstem from the proximal end thereof, and wherein the diverging section of each of said earstems extends substantially along the arc defined by the arcuate frame.

2. An eyeglass as in claim 1, wherein the diverging section on each earstem is substantially linear.

3. An eyeglass as in claim 1, wherein the converging section on each earstem is substantially linear.

4. An eyeglass as in claim 1, further comprising a unitary eyeglass lens mounted on said arcuate upper frame.

5. Eyewear as in claim 1, wherein the retaining section on each earstem is substantially linear.

6. Eyewear comprising two earstems in combination with a unitary arcuate upper frame configured to accommodate a range of head widths while providing a medically directed force at the distal ends of the earstems, and while minimizing contact between the proximal portions of the earstems and the head, each of said earstems being mounted to said frame such that each earstem has a first side away from the head of a wearer thereof and a second side opposite the first side, each of said earstems, comprising:

a hinge element at the proximal end of the earstem;

a diverging section extending from the proximal end of the earstem, distal to said hinge;

a transition section on the earstem distal to and adjacent said diverging section, which increases the lateral distance between the transition section and the head;

a converging section distal to said transition section; and a retaining section on the earstem disposed distally to the converging section, said retaining section disposed so as to provide a medially directed force in contact with the side of the head, wherein the intersection of the converging section and the retaining section is at a point within the range of from about $\frac{1}{4}$ to about $\frac{1}{2}$ the overall length of the earstem from the proximal end thereof, and wherein the intersection of the converging section and the retaining section forms an obtuse angle on said first side.

7. Eyewear as in claim 6, wherein the diverging section of each of said earstems extends substantially along the arc defined by the arcuate frame.

* * * * *

UNITED STATES PATENT AND TRADEMARK OFFICE
CERTIFICATE OF CORRECTION

PATENT NO. : 5,249,001
DATED : September 28, 1993
INVENTOR(S) : James H. Jannard It is certified that error appears in the above-indentified patent and that said Letters Patent is hereby corrected as shown below:

Column 8, line 9, change "medically" to --medially--

Signed and Sealed this

Seventeenth Day of June, 1997

*Attest:*

BRUCE LEHMAN

*Attesting Officer*     *Commissioner of Patents and Trademarks*